Figure 8:
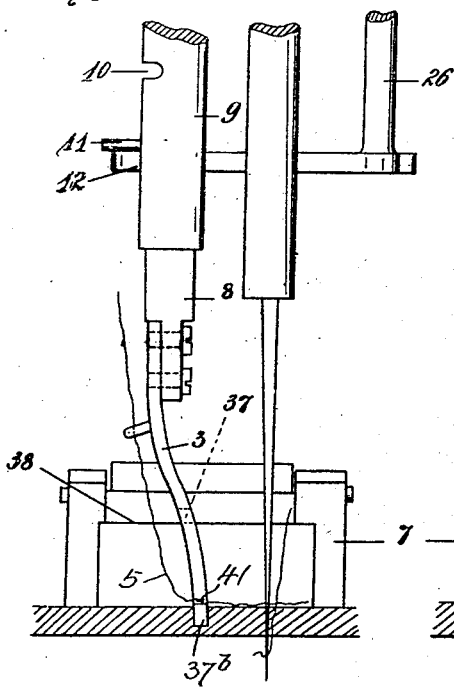

No. 765,341. PATENTED JULY 19, 1904.
A. JEUDE.
BUTTONHOLE SEWING MACHINE.
APPLICATION FILED AUG. 7, 1901.
NO MODEL. 8 SHEETS—SHEET 1.
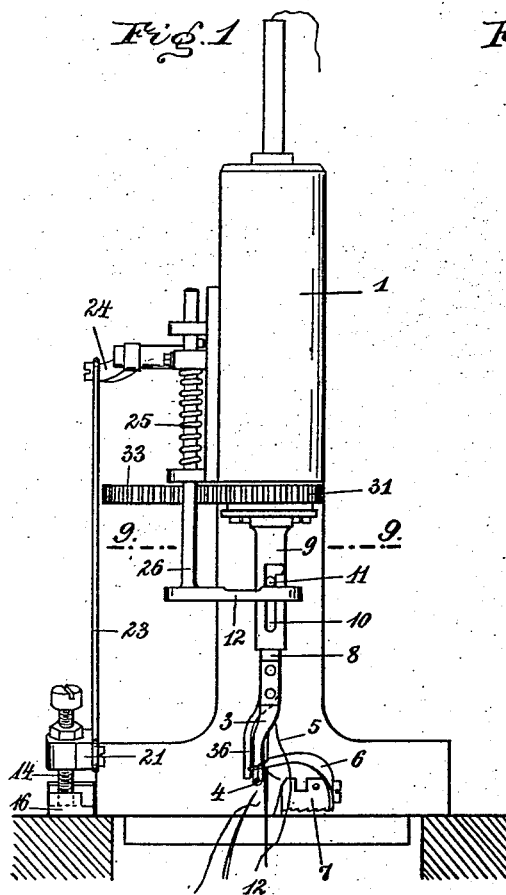
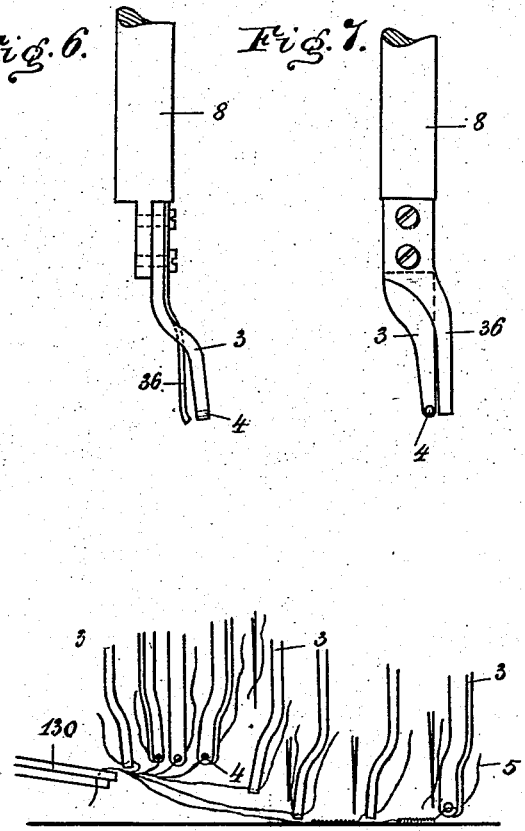
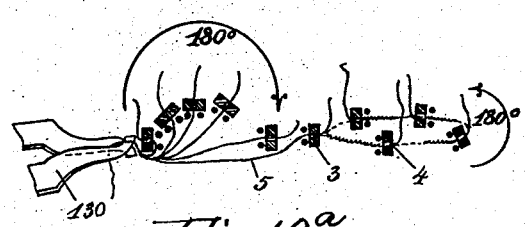
Witnesses
R. Aberli
John Lotka
Inventor
August Jeude
By
Briesen & Knauth
his Attorneys

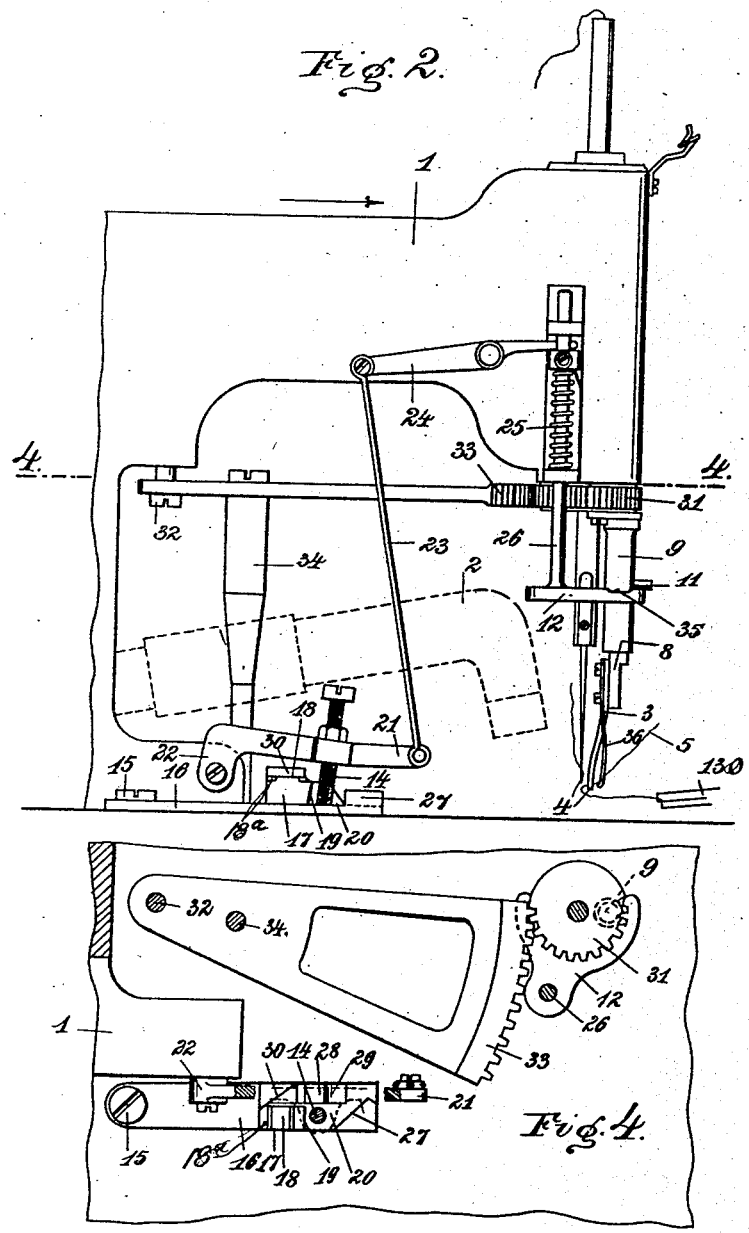

No. 765,341. PATENTED JULY 19, 1904.
A. JEUDE.
BUTTONHOLE SEWING MACHINE.
APPLICATION FILED AUG. 7, 1901.
NO MODEL. 8 SHEETS—SHEET 3.
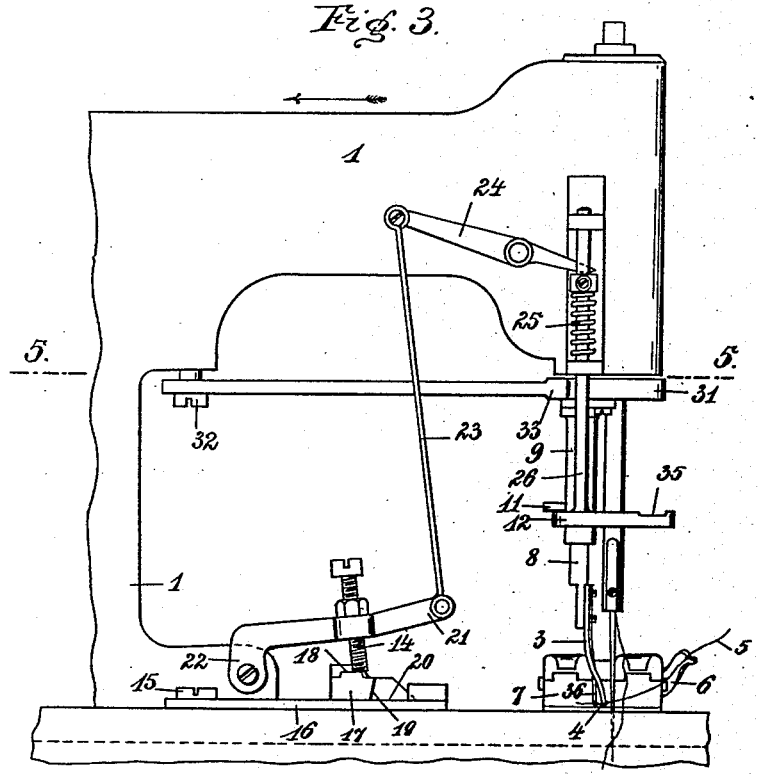
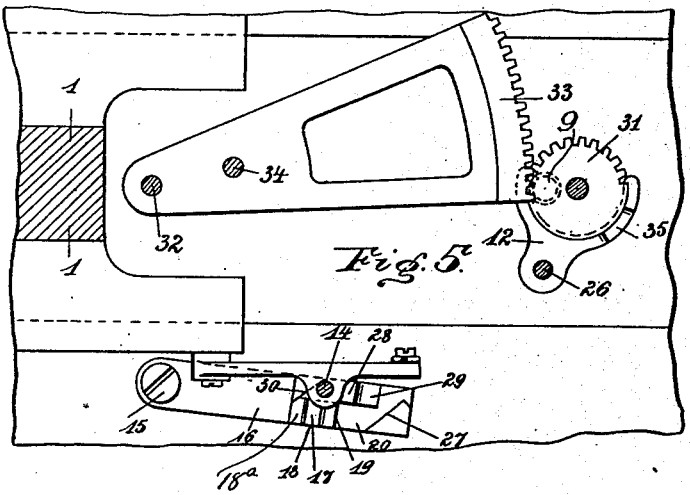

No. 765,341. PATENTED JULY 19, 1904.
A. JEUDE.
BUTTONHOLE SEWING MACHINE.
APPLICATION FILED AUG. 7, 1901.
NO MODEL. 8 SHEETS—SHEET 4.

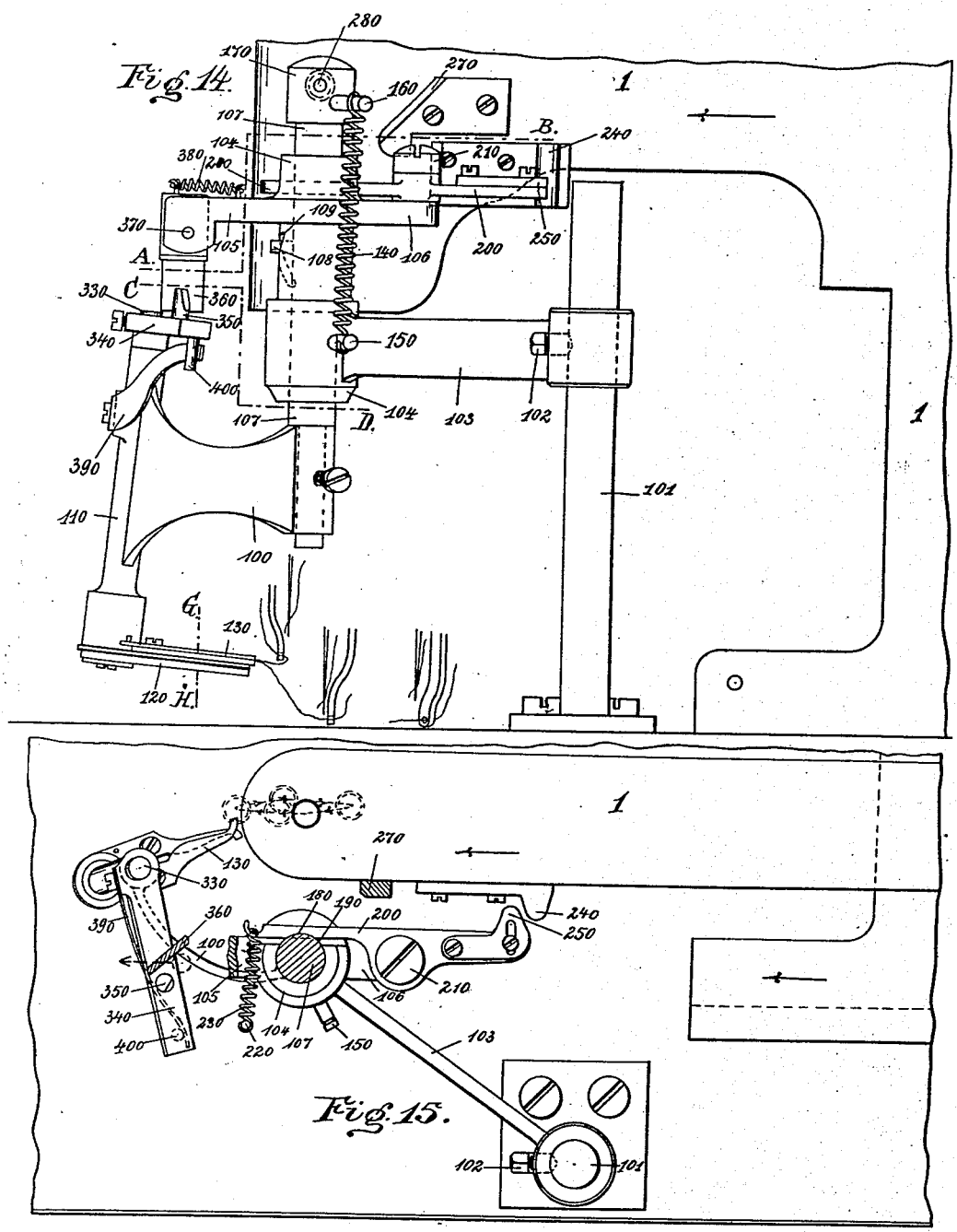

No. 765,341. PATENTED JULY 19, 1904.
A. JEUDE.
BUTTONHOLE SEWING MACHINE.
APPLICATION FILED AUG. 7, 1901.
NO MODEL. 8 SHEETS—SHEET 6.
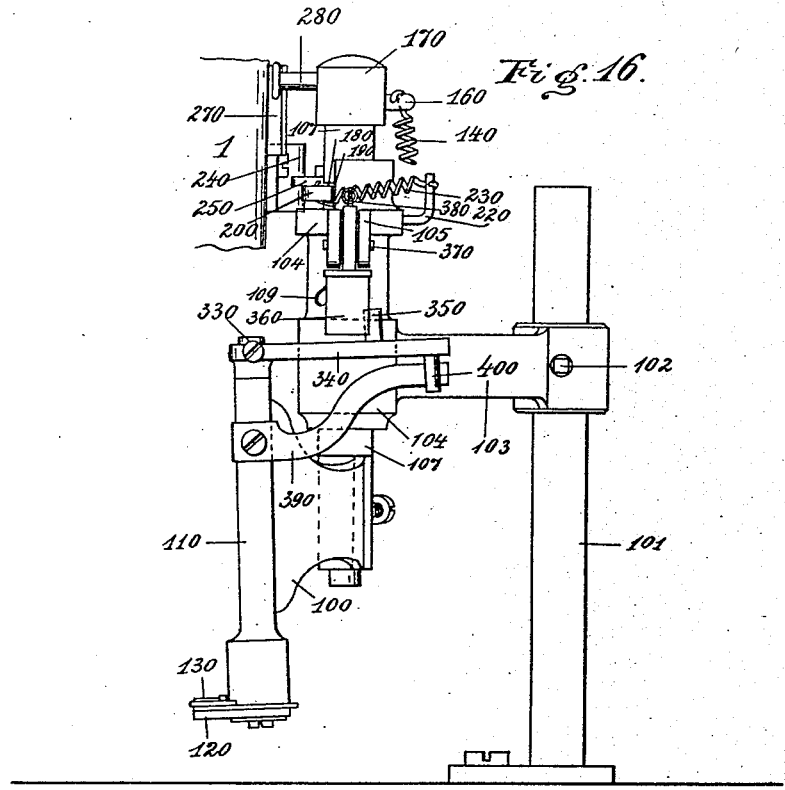
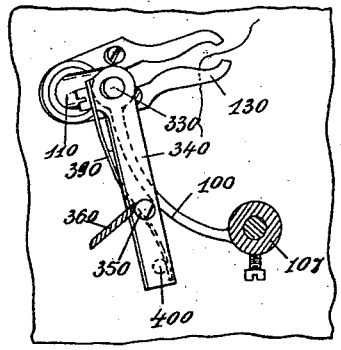
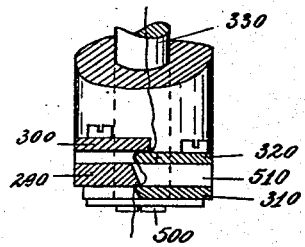
Witnesses
R. Aberli
John Lotka
Inventor
August Jeude
By
Briesen & Knauth
his Attorneys No. 765,341. PATENTED JULY 19, 1904.
A. JEUDE.
BUTTONHOLE SEWING MACHINE.
APPLICATION FILED AUG. 7, 1901.
NO MODEL. 8 SHEETS—SHEET 8.

WITNESSES:
John A. Kehlenbeck.
John Lotka.

INVENTOR
August Jeude
BY
ATTORNEYS

No. 765,341. Patented July 19, 1904.

UNITED STATES PATENT OFFICE.

AUGUST JEUDE, OF LEIPZIG-STÖTTERITZ, GERMANY, ASSIGNOR TO AARON VAIL ROWLEY, OF FRANKFORT-ON-THE-MAIN, GERMANY.

BUTTONHOLE-SEWING MACHINE.

SPECIFICATION forming part of Letters Patent No. 765,341, dated July 19, 1904.

Application filed August 7, 1901. Serial No. 71,181. (No model.)

*To all whom it may concern:*

Be it known that I, AUGUST JEUDE, mechanician, residing at Leipzig-Stötteritz, Leipzigerstrasse No. 151 D, in the Kingdom of Saxony, Germany, have invented new and useful Improvements in Buttonhole-Sewing Machines, of which the following is a specification.

This invention relates to sewing-machines generally, and more particularly to overedge sewing-machines such as are used for overseaming the edges of buttonholes, and in the following description the invention will be described as applied to a buttonhole-sewing machine of the well-known type, in which the buttonhole is first cut and then has its two edges stitched and in which the sewing is effected by means of a straight needle located above the work and moving vertically and a bent needle located below the work and movable in a curved path. These machines are so arranged that the fabric remains stationary while the sewing instruments are carried by an arm of the machine which moves with relation to the work. These machines have other special mechanisms for cutting the buttonholes, for actuating the sewing mechanism, and for other purposes; but as these mechanisms are well known in the art and do not form part of the present invention they are not herein fully described or shown in detail in the accompanying drawings.

An objectionable feature about buttonholes as they are made on the usual buttonhole-sewing machine is that the cut ends of the filaments or fibers of the fabric protrude into the buttonhole between the stitches. This is due to the fact that the necessary degree of tension on the sewing-thread causes this thread to be drawn so deeply into the cut edge that the fibers of the fabric necessarily project between the successive stitches.

One important feature of the present invention consists in mechanism for overcoming this difficulty by placing a suitable thread, herein called the "insertion-thread," upon or over the cut filaments, preferably upon the corner or angular edge formed by the buttonhole-opening and one side of the fabric, so that when the stitches are formed over the cut edge and around the insertion-thread they are prevented by said thread from being drawn by the tension into the cut edge of the fabric. In this way any protrusion of the ends of the filaments is rendered impossible, because the ends of the filaments are bound between the new thread on the angular edge of the buttonhole and the common gimp-thread, if a gimp-thread is used, or the purl of the sewing-thread on the other side of the fabric. This new thread may, if desired, take the place of the gimp-thread heretofore used and which is located somewhat back from the angular edge of the buttonhole, or it may be applied in addition to the gimp-thread, thus affording increased strength.

For the purpose of properly placing the insertion-thread at the angle formed by the cut edge of the buttonhole and one side of the fabric I have provided the buttonhole-sewing machine with a thread-guide arranged in advance of the needle to locate the insertion-thread in the desired position, where it will be secured by the stitch-forming mechanism. Preferably the thread-guide will bear upon the angular edge of the buttonhole or slightly enter the buttonhole, so as to place the thread accurately. It is to be understood that the thread-guide moves along the sides of the buttonhole and turns around the curved eye thereof slightly in advance of the upper needle, and I have found it desirable for the best results to slightly raise the thread-guide while passing around the edge of the buttonhole to facilitate the turning of the guide. I have therefore provided means for moving the thread-guide up and down, and thereby controlling its vertical position during the sewing of different portions of the buttonhole.

I have also provided means by which the normal position of the thread-guide may be controlled automatically by the thickness of the work.

Another important feature of my invention consists in providing means to hold the free end of the insertion-thread and to coöperate with the thread-guide for so placing the end portion of the insertion-thread that it will be secured by the stitch-forming mechanism at the beginning of the seam. This relieves the operator from the necessity of manually holding the free end of the insertion-thread in proper relation to the stitch-forming mechanism so that the thread will be secured by the stitches at the beginning of the seam. In the embodiment of this feature of the invention herein shown the end of the insertion-thread is held in a clamp, and preferably this clamp retains its hold on the thread until the completion of the seam and then releases it and engages the portion of the thread leading from the thread-guide to the last end of the seam and which will be the thread leading to the beginning of the next seam.

I have also provided a thread-cutter and operating mechanism for causing the cutter to engage the portion of the insertion-thread leading to the beginning of the seam and trim it off close to the surface of the work after the seam has been commenced.

The thread cutting and clamping mechanism is claimed in this application merely in combination with my novel seam-forming mechanism, with which it coöperates in the formation of the buttonhole-seam. In accordance with the requirement of the Patent Office I have included in a divisional application, Serial No. 201,552, filed April 4, 1904, claims which relate more particularly to the features of the invention which coöperate in the thread cutting and clamping operations *per se.*

Other features of the invention, including combinations of parts and details of construction, will be hereinafter described, and pointed out in the claims.

Figure 9:
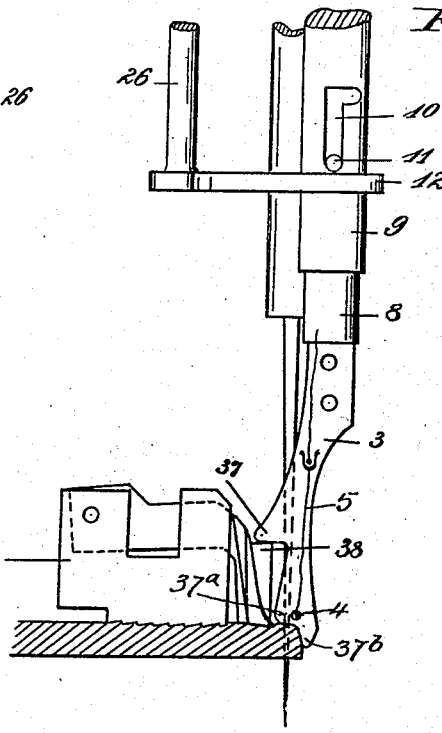
Figure 12:
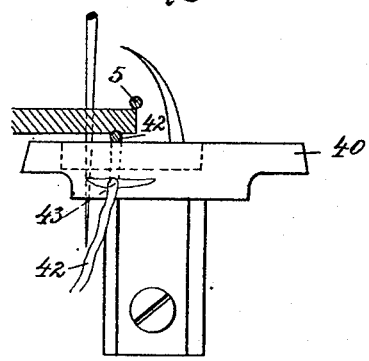
Figure 13:
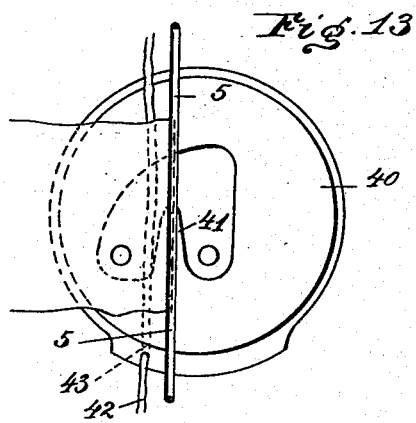
Figures 18, 21:
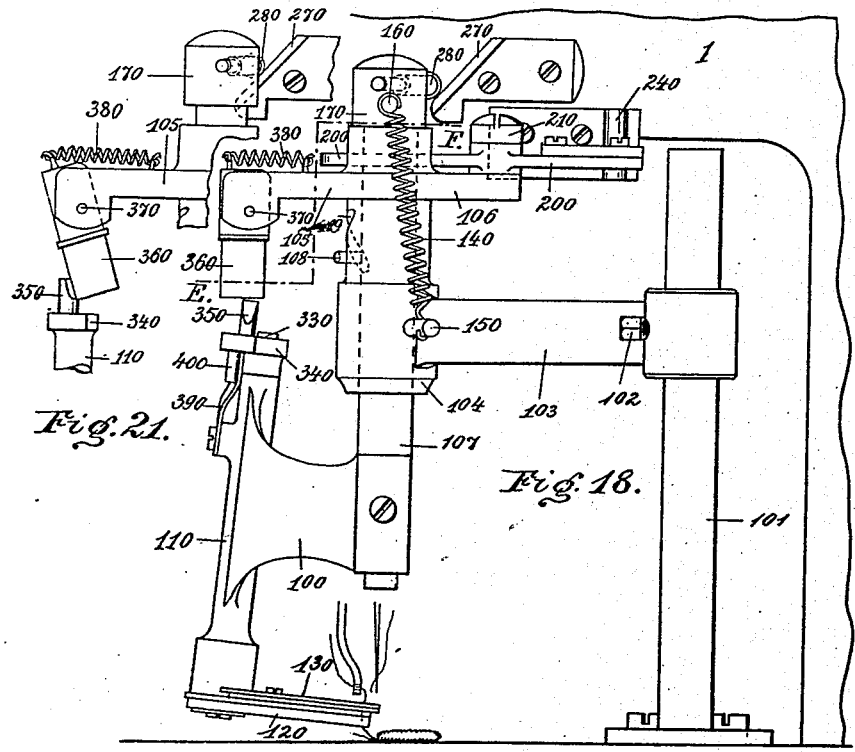
Figure 19:
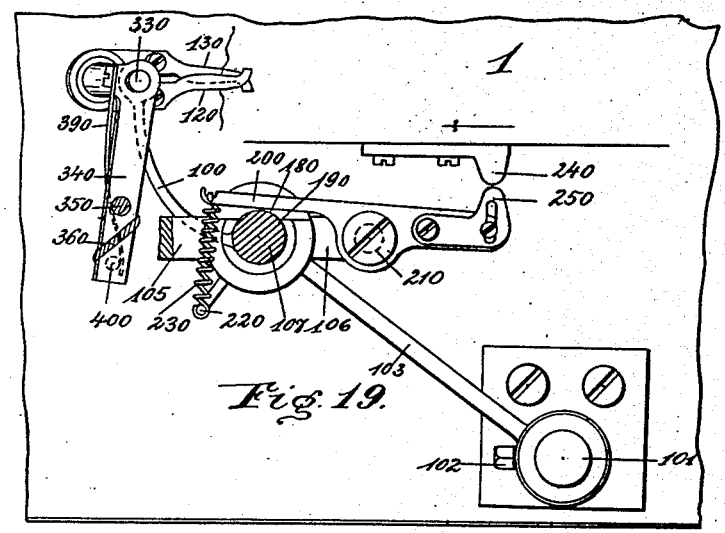
Figure 22:
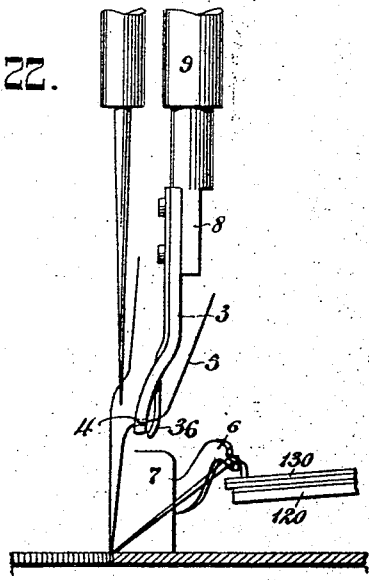
Figure 23:
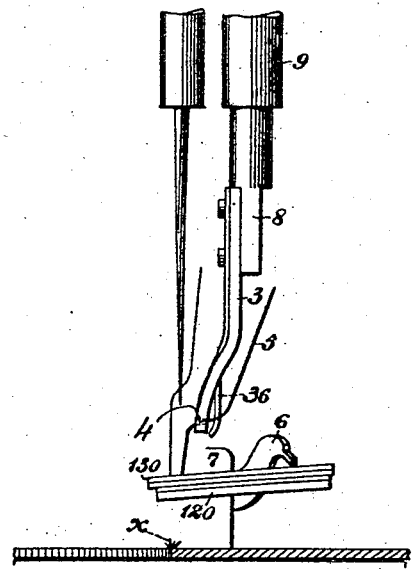
Figure 24:
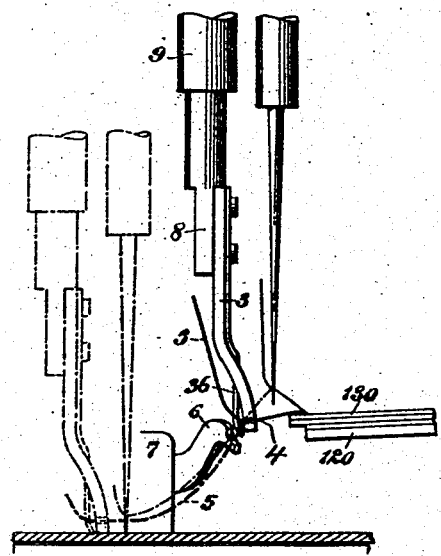

Figure 1 shows the front view of the device for laying on the insertion-thread. Fig. 2 is a side view showing the raised position of the thread-guide. Fig. 3 is a side view showing the lowered position of the thread-guide. Figs. 4 and 5 show sections on the lines 4 4 and 5 5 of Figs. 2 and 3, respectively. Figs. 6 and 7 show the working part of the thread-guide in two views upon an enlarged scale. Figs. 8 and 9 show another construction of the thread-guide in two views upon an enlarged scale. Fig. 10 is a side elevation showing the various positions of the thread-guide at the different parts of the buttonhole. Fig. 10ª is a horizontal sectional view of the parts in the positions illustrated in Fig. 10. Fig. 11 shows a sectional plan on line 9 9, Fig. 1. Figs. 12 and 13 show the positions of the new or insertion thread. Fig. 14 shows a side view of the device for cutting off the thread in the position before the commencement of the operation. Fig. 15 shows a plan of Fig. 14, partly in section, on line A B, Fig. 14. Fig. 16 is a front view of Fig. 14. Fig. 17 shows a section on line C D, Fig. 14, with the parts near the end of the working motion after the opening of the shears and clamping-cheeks and before the reclosing thereof. Fig. 18 is a side view of the device in the closed position. Fig. 19 is a plan of Fig. 18, partly in section, on line E F. Fig. 20 is a section, upon an enlarged scale, through the shears and clamp on line G H, Fig. 14. Fig. 21 shows a separate view of parts of Fig. 18 in a different position. Figs. 22, 23, and 24 are elevations of the upper needle, the guide for the insertion-thread, the thread-clamp, and the thread-cutter, showing these parts in different positions and illustrating their coöperation.

The mechanism for applying the insertion-thread is constructed as follows in the machine illustrated by the drawings: The position of the insertion-thread 5, as shown in Figs. 12 and 13, is upon the upper corner or edge of the buttonhole—that is, at that line where the upper surface of the fabric meets the side of the buttonhole. Upon the lower side of the fabric and at a slight distance from the edge of the buttonhole is located the gimp-thread 42, which passes through a channel 43 in the sewing-plate 40, having a tongue 41, at each side of which are arranged the upper and lower thread-spools, respectively. The gimp-thread 42 lies at such a distance from the edge of the buttonhole that it is not serviceable for efficiently retaining the cut filament ends. The insertion-thread 5 is supplied from a suitable spool and passes through an eye 4 in a thread-guide 3. This thread-guide is carried in the specific manner presently to be stated upon the arm 1, which moves to and fro in the direction of the arrow, said direction being parallel to that of the buttonhole. In Fig. 2 I have indicated in dotted lines a knife 2 for cutting the buttonhole. The seam is formed by two needles or any suitable stitch-forming mechanism. The thread-guide 3 has its eye arranged somewhat eccentrically to the guide-holder 8, which has a vertical movement in the socket 9. A pin 11 projects from the shank or holder 8 through a slot 10 in said socket and rests upon a disk or flange 12, which embraces the thread-guide. The flange 12 is secured to the lower end of a vertically-movable rod 26, which is normally held in its upper position by a spring 25. The rod 26 may be pressed downward by means of a lever 24, which is connected by a rod 23 with a rocking arm 21, pivoted at 22 to the foot of the arm 1. On the frame of the machine is mounted an abutment-piece or controlling-piece 16, which therefore does not share the reciprocating movement of the arm 1. This controlling-piece, however, is capable of a slight angular movement, being pivotally mounted at 15. The controlling-piece carries a block 17, with a projection 18 at the top and a depression 18ª at the end of said block. Block 17 has a substantially perpendicular shoulder 19, which leads to a horizontal surface 20, on which is adapted to bear a screw 14, carried by the arm 21. To the right of this horizontal surface in Figs. 2 and 4 is located an oblique or deflecting member 27, and adjacent to the block 17, at one side thereof, is located another deflecting-surface 30 and another block 28, to which leads an inclined surface 29. The inclined surface 29, the block 28, and the deflecting-surface 30 are substantially in a straight line, and in another straight line, which is practically parallel with the one first mentioned, I arrange the block 17 and the deflector 27. It will be understood that as the arm 1 reciprocates it will carry the screw 14 with it, and if the arm moves to the right from the position shown in Fig. 2 the screw will come in contact with the deflector 27, and will thus cause the controlling-piece 16 to swing laterally on its pivot 15. Owing to this swinging movement the screw 14 will at the movement of the arm 1 toward the right ride up the incline 29, so as to reach the top of the block 28 and will finally engage the deflector 30. This will cause the controlling-piece 16 to swing back to its original position and will bring the screw 14 onto the portion 18$^a$ of the block 17, which portion, as before stated, is slightly lower than the projection 18. The projection 18 and the block 28 are at substantially the same level. It will be readily understood that as the screw 14 moves up and down a similar motion is imparted to the rocking arm 21, and this motion is transmitted in a reverse direction to the rod 26 and to the flange 12, carried by said rod. This flange is provided with a depression or recess 35, which is adapted to be engaged by the pin 11 of the holder 8 when said holder is in a predetermined position, as will be described hereinafter. The sleeve or socket 9, in which the guide-holder 8 moves, is provided with a toothed sector 31, journaled at it its center upon the arm 1. The sleeve 9 is located eccentrically with reference to said sector. This sector 31 is in engagement with another toothed sector 33, mounted to oscillate about a pivot 32, secured upon the arm 1. An arm 34 is provided for moving the sector 33 to and fro.

At the side of the thread-guide 3 is arranged an elastic cloth-presser 36, preferably secured on the same holder or shank 8, this presser being adapted to forcibly engage the fabric close to the eye of the thread-guide, so as to positively place the insertion-thread on the edge or corner of the buttonhole.

Another form of thread-guide is shown in Figs. 8 and 9. The mechanism for swinging the thread-guide in this construction may be the same as the one described hereinbefore. The vertical position of the thread-guide, however, is in this case controlled in a much simpler manner—to wit, by means of a lug 37 on the thread-guide, which lug is adapted to engage a path 38, provided on the cloth-clamp or cloth-presser 7. The thread-guide, further, has a second lug 37$^a$, which is adapted to rest on the edge of the buttonhole, so that the extreme lower end 37$^b$ of the thread-guide below the eye 4 is adapted to project into the buttonhole.

It will be understood that the flange 12 may also be employed in this case, in connection with the pin 11 on the holder 8. to raise the thread-guide entirely away from the fabric. It will be understood that the lug 37$^a$ controls the position of the thread-guide relatively to the buttonhole in accordance with the thickness of the fabric and that with this construction the insertion-thread 5, which passes through the eye 4, will always be placed exactly on top of the corner formed at the upper edge of the buttonhole. The lower extremity 37$^b$ of the thread-guide forms an efficient guide to place the insertion-thread exactly on top of the fabric at the edge of the buttonhole, as shown in Fig. 12.

In connection with the devices above described for properly positioning the insertion-thread 5 I provide means for clamping the thread, which means are preferably combined with a cutter and with a holder to temporarily support the thread when released from the clamp. In the particular embodiment illustrated by the drawings these devices are constructed as follows:

Upon a standard 101, secured to the frame of the machine, is rigidly carried, as by means of a set-screw 102, an arm 103, provided at its free end with a socket 104, having arms 105 106 projected in opposite directions from its upper end. In the socket is adapted to move up and down a rod 107, provided with a pin 108, projecting through a helical or screw slot 109 in the socket, so that the rod in moving up and down will also turn about its axis. To the lower end of the rod 107 is rigidly secured an arm 100, carrying at its free end a socket 110, upon which are supported the clamp 130 and the cutter 120. A spring 140 engages a pin 150 upon the socket 104, and also a pin 160 upon the head 170 of the rod 107, so as to tend to move the said rod downwardly. To normally lock the rod 107 in its upper position, I provide said rod with a notch 180, (see Fig. 15,) into which is adapted to project a locking-arm 200, fulcrumed at 210 upon the arm 106. This locking-arm 200 is also adapted to project through a notch 190 of the socket 104. A spring 230 is employed to draw the locking-arm toward the rod 107, the stationary end of said spring being secured to a pin 220. In order to release the rod 107, I provide an operating member 240 upon the arm 1 of the machine. This operating member is adapted to strike a projection 250 on the locking-arm 200, the projection being preferably adjustable, as shown. The motion of the arm 1 is not purely reciprocating—that is, the forward path and return-path are not the same—and thus the operating member 240 engages the projection 250 to release the rod 107 only when the arm 1 moves in the direction indicated by the arrow in Figs. 14 and 15; but on the return motion the operating member 240 passes at such a distance from the projection 250 as not to engage it. It will be understood that as soon as the rod 107 is released the spring 140 will operate to throw the said rod down, causing the clamp 130 and the cutter 120 to move from the upper position (shown in Figs. 14, 15, and 16) to the lower position. (Shown in Figs. 18 and 19.) To bring the rod 107 and the parts carried thereby back to their upper position, I provide an inclined abutment 270 on the arm 1, which abutment is adapted to engage a pin 280, projected from the head 170, so as to raise the said head and the rod 107.

The detail construction of the clamp and of the cutter, together with the mechanism for causing them to open and close, is as follows in the machine illustrated by the drawings: To the lower end of the socket 110 is secured one blade, 290, of the cutter and also one member, 300, of the clamp. The other clamp member, 320, and the other cutter-blade, 310, are rigidly secured to the spindle 330, which is arranged within the socket 110. The cutter-blade 310 is secured by means of a screw 500, and the clamp member 320 is secured either directly to the spindle 330 or to an intermediate piece 510, as by means of a screw 501. The upper end of the spindle 330 is provided with an arm 340, having a contact-pin 350. This pin is adapted to bear against a contact member 360 when the arm 100 moves helically downward. The contact member 360 is suspended from a pivot 370 on the arm 105 and is held in its normal position by a spring 380. It will be understood that the contact member 360 forms an obstruction in the path of the pin 350, so as to detain said pin, and with it the spindle 330, for a time, thus causing the clamp and the cutter to open while the arm 100 continues its movement. In order to close the clamp and the cutter, I provide a spring 390, which is secured to the socket 110 and bears against a pin 400 on the arm 340. In order to allow the contact member 360 to move out of the path of the pin 350 during the return movement of such pin, the said contact member is disposed obliquely, as shown best in Figs. 15, 17, and 19, so that when the pin 350 engages the contact member from the rear it will swing said contact member to one side, as shown in Fig. 21, so that the pin will not be detained and the clamp and cutter will remain closed. The contact member 360 swings back to its normal vertical position under the influence of the spring 380.

As a means for holding the thread which leads to the beginning of the seam, I have provided a support or holder 6, which preferably is secured to the cloth-clamp or cloth-presser 7 and which is adapted to engage the thread, and particularly the insertion-thread 5, between the fabric and the clamp 130. This holder is shown in Figs. 1, 22, 23, and 24. The operation of the mechanism is as follows:

In the position illustrated by Fig. 2 the thread-guide 3 is above the fabric, and a movement of the arm 1 to the right occurs at first, which brings the parts to the position shown in full lines in Fig. 24. During such movement the screw 14 engages the deflector 27, and thus swings the incline 29 into the path of the screw. As the movement of the arm 1 from right to left takes place the screw 14 rides up the incline 29, and thus the flange 12 and the thread-guide 3, with the cloth-presser 36, are lowered upon the fabric. This occurs at a slight distance from the end of the buttonhole. As the motion of the arm 1 to the left continues the screw 14 reaches the deflector 30 at the end of the block 28, and thus the controlling-piece 16 is shifted laterally, so that the screw 14 comes to rest on the depression $18^a$. This causes the flange 12 and the thread-guide to rise slightly, and inasmuch as the screw 14 engages the depression $18^a$ when the arm 1 has moved fully to the left it will be understood that this slight raising of the thread-guide 3 occurs at the time the eye of the buttonhole is sewed. This facilitates the leading of the insertion-thread around the eye. It is, however, of advantage toward the end of the operation of leading around the eye to lower the thread somewhat in order to bring it accurately into position. To this end the flat recess 35 is so located that the insertion-thread is lowered slightly near the completion of the turning around the eye in consequence of the pin 11 of the guide-holder 8 dropping into the recess before the guide-holder is depressed by the screw 14 rising onto the projection 18. It will be understood that while the thread-guide 3 is raised at the eye of the buttonhole it is turned through an angle of substantially one hundred and eighty degrees by the intermeshing sections 31 and 33. As the arm 1 returns toward the right the screw 14 moves on the block 18, and thus keeps the thread-guide 3 down until at the point where the stitching is to cease the screw 14 drops on the horizontal surface 20, thus raising the thread-guide away from the fabric to the position shown in Fig. 2. The thread-guide 3 is turned in the opposite direction by the action of the sectors 31 33 when the end of the buttonhole opposite to the eye is reached. The insertion-thread 5 is laid upon the edge or corner of the fabric at the buttonhole (see Fig. 12) and is securely held in such position by the threads of the stitching mechanism. Thus the strand of the insertion-thread prevents a protrusion of the cut filaments and is itself so securely held as to be unable to shift away from the edge of the buttonhole.

When employing the construction shown in Figs. 8 and 9, the lower extremity 37ᵇ of the thread-guide projects into the buttonhole and the lug 37ᵃ engages the top of the fabric, so that the thread-guide is positively held in a definite position relatively to the edge of the buttonhole, it being understood that the material itself controls such position. In addition to this the lug 37 of the thread-guide rides on the path 38, and thus the up-and-down movement of the thread-guide is controlled or limited in a positive manner. The lug 37ᵃ also forms a cloth-presser for the edge of the fabric at the buttonhole, and the same function is performed in the form of construction illustrated by Figs. 1 to 7 by the cloth-presser 36.

In regard to the action of the thread-clamp 130 and the thread-cutter 120 the following explanation is given with particular reference to Figs. 22, 23, and 24: Fig. 22 shows the upper needle and the thread-guide 3, together with the threads and the clamp, in the position at the end of the sewing operation. The clamp 130 still holds the ends of the threads which lead to the beginning of the seam, these portions of the threads being placed over the guide or holder 6. Then the clamp 130 and cutter 120 move toward the needle and thread-guide, passing below the plane of the holder 6 into the positon shown in Fig. 23. During this movement the clamp releases the threads, which, however, are caught in the angle between the members of the cutter 120, which also receives the thread portions which extend upward from the end of the seam to the upper needle and to the thread-guide 3. While the parts are in this position the blades of the cutter 120 close so as to cut all four thread portions, the cut ends being shown at x in Fig. 23, and at the same time the members of the clamp close so as to grip that portion of the thread which will form the beginning for the next seam and the strand of the insertion-thread 5 for the next buttonhole. Thereupon the needle and thread-guide 3 move to the right, as do also the clamp 130 and cutter 120, carrying the parts to the position illustrated by full lines in Fig. 24. From this position the upper needle and the thread-guide 3 return to that shown in dotted lines in Fig. 24, which position is substantially the same as that shown in Figs. 3 and 8. The clamp 130 and cutter 120 meanwhile return to the lower position shown in Fig. 22, (also in Fig. 2,) and in consequence of these combined movements the threads are laid over the holder 6, as shown in Fig. 22. These ends of the threads remain securely clamped while the seam is being made and are released only immediately before the cutter 120 comes into action, as described. The fact that said cutter is made of two members, which receive the threads between them, is of importance, inasmuch as the cutter itself will catch and hold the thread ends when they are released by the clamp, and thus it becomes possible to cut the four ends of the threads close to the buttonhole—that is, the threads which lead to the beginning of the seam are cut together with those extending from the end of the seam.

It will be understood that the thread-guide 3 moves in advance of the needle carrying the sewing-thread. It will also be observed that the clamp 130 and the guide 3 are situated on opposite sides of the stitch-forming mechanism which is formed by the two needles. With this arrangement an accurate positioning of the insertion-thread 5 is insured.

What I claim as new, and desire to secure by Letters Patent, is—

1. In a buttonhole-sewing machine, the combination with stitch-forming mechanism of means for placing an insertion-thread on the fabric at the angle between one side of the fabric and the edge of the buttonhole in conformity with the contour of the buttonhole, and holding said insertion-thread in such position while it is being secured by the stitch-forming mechanism, and means for actuating said stitch-forming mechanism to lay threads over said insertion-thread.

2. In a buttonhole-sewing machine, the combination with means for placing a gimp-thread on one side of the fabric and means for placing an insertion-thread at the angle between the other side of the fabric and the edge of the buttonhole, of stitch-forming mechanism arranged to bind said insertion-thread in direct contact with the fabric throughout the length of the buttonhole.

3. In a buttonhole-sewing machine, the combination with stitch-forming mechanism of a thread-guide for placing a gimp-thread on one side of the fabric, a thread-guide for placing an insertion-thread on the fabric at the angle between the other side of the fabric and the edge of the buttonhole, and means for changing relatively the paths of said thread-guides while the eye of the buttonhole is being sewed.

4. In a buttonhole-sewing machine, the combination with stitch-forming mechanism of means for placing an insertion-thread on the fabric at the angle between one side of the fabric and the edge of the buttonhole, said means comprising a clamp for holding the end of the insertion-thread and a guide for positioning the strand of the insertion-thread, said clamp and guide being located upon opposite sides of the stitch-forming mechanism in starting the stitching of the buttonhole, whereby the end portion of the thread is secured in accurate position.

5. In a buttonhole-sewing machine, the combination with stitch-forming mechanism of means for placing an insertion-thread on the fabric at the angle between one side of the fabric and the edge of the buttonhole, said means comprising a clamp for holding the end of the insertion-thread and a guide for positioning the strand of the insertion-thread, said clamp and guide being located upon opposite sides of the stitch-forming mechanism, whereby the end portion of the thread is secured in accurate position, and a cutter cooperating with said clamp to trim off the loose end portion of the thread close to the fabric after the sewing has commenced.

6. In a buttonhole-sewing machine, the combination with stitch-forming mechanism of a thread-guide movable along the buttonhole in advance of the stitch-forming mechanism, and means for moving the thread-guide up and down while sewing around the eye of the buttonhole.

7. In a buttonhole-sewing machine, the combination with stitch-forming mechanism of a thread-guide movable along the buttonhole in advance of the stitch-forming mechanism and having a portion adapted to be received in the buttonhole and be guided thereby to place a thread along the edge of the buttonhole, and automatic means for lifting the thread-guide at the eye of the buttonhole to facilitate the turning of the guide.

8. In a buttonhole-sewing machine, the combination with stitch-forming mechanism of a thread-guide movable along the buttonhole in advance of the stitch-forming mechanism, and having a portion adapted to be received in the buttonhole and be guided thereby to place a thread along the edge of the buttonhole, of automatic means for lifting the thread-guide at the eye of the buttonhole to facilitate the turning of the guide, and means for moving the thread-guide up and down while the eye of the buttonhole is being stitched.

9. A buttonhole-sewing machine comprising the combination with stitch-forming mechanism of a combined cloth-presser and thread-guide having a portion adapted to rest upon the fabric at the edge of the buttonhole and a portion adapted to enter the buttonhole, and means to move said combined presser and guide longitudinally of the buttonhole.

10. A buttonhole-sewing machine comprising the combination with stitch-forming mechanism of a combined cloth-presser and thread-guide having a portion adapted to rest upon the fabric at the edge of the buttonhole and a portion adapted to enter the buttonhole, and being provided with a thread-guiding eye located adjacent to the angle between said two portions to place a thread at the angle between the edge and face of the buttonhole, and means to move said combined presser and guide longitudinally of the buttonhole.

11. A buttonhole-sewing machine comprising the combination with stitch-forming mechanism of a thread-guide for placing an insertion-thread along the edge of the buttonhole, of means controlled by the thickness of the work for supporting the guide in desired relation to the work, and means to move the guide longitudinally of the buttonhole.

12. A buttonhole-sewing machine comprising the combination with stitch-forming mechanism of a thread-guide for placing an insertion-thread along the edge of the buttonhole, of means intermediate the work and the thread-guide and controlled by the thickness of the work for supporting the guide in desired relation to the work, and means to move the guide longitudinally of the buttonhole.

13. In a buttonhole-sewing machine, the combination with stitch-forming mechanism of a thread-guide for placing an insertion-thread along the edge of the buttonhole, of means controlled by the thickness of the work for supporting the guide in desired relation to the work while one portion of the buttonhole is being stitched, and independent means for positioning the guide while another portion of the buttonhole is being stitched.

14. In a buttonhole-sewing machine, the combination with stitch-forming mechanism of a thread-guide for placing an insertion-thread along the edge of the buttonhole, of means for sustaining the thread-guide in one position with relation to the work while the insertion-thread is being placed along the sides of the buttonhole, and means for sustaining said thread-guide in a different relation to the work while the insertion-thread is being placed around the eye of the buttonhole.

15. In a buttonhole-sewing machine, the combination with stitch-forming mechanism, of a thread-guide for placing an insertion-thread along the edge of the buttonhole, of means for supporting the thread-guide in one vertical relation to the work while one part of the buttonhole is being stitched, and means for changing automatically the vertical relation of the thread-guide to the work while a different portion of the buttonhole is being stitched.

16. In a buttonhole-sewing machine, the combination, with a thread-guide provided at the upper side of the fabric, of means to move said guide longitudinally of the buttonhole in a path substantially parallel with the edge of the buttonhole, and to turn it at the eye of the buttonhole.

17. In a buttonhole-sewing machine, the combination with a thread-guide provided at the upper side of the fabric, of means to move said guide to and fro along the buttonhole and to turn it at the eye of the buttonhole, a needle and means to actuate it to travel along the buttonhole in the rear of the said thread-guide.

18. In a buttonhole-sewing machine, the combination with a thread-guide provided at the upper side of the fabric, of means to move said guide to and fro along the buttonhole and to turn it at the eye of the buttonhole, and means to lower and to raise the said thread-guide while traveling along the buttonhole.

19. In a buttonhole-sewing machine, the combination with a thread-guide provided at per side of the fabric, of means to move guide to and fro along the buttonhole and turn it at the eye of the buttonhole, and means to raise the said thread-guide while turning around the needle at the eye of the buttonhole.

20. In a buttonhole-sewing machine, the combination with a thread-guide provided at the upper side of the fabric, of means to move said guide to and fro along the buttonhole and to turn it at the eye of the buttonhole, a pin provided on the thread-guide, a circular flange surrounding the thread-guide and serving as a support for the said pin, and means to raise and to lower the said flange.

21. In a buttonhole-sewing machine, the combination with a thread-guide provided at the upper side of the fabric, of means to move said guide to and fro along the buttonhole and to turn it at the eye of the buttonhole, a holder carrying said guide eccentrically, a toothed sector on the guide-holder, and a second toothed sector engaging the first one, and means to oscillate the latter sector.

22. In a sewing-machine, the combination with a needle and a thread-guide adjacent thereto, of means for moving said guide lengthwise of the seam, and a cloth-presser provided with a path on which a portion of the said thread-guide is adapted to slide.

In testimony whereof I have signed my name to this specification in the presence of two subscribing witnesses.

AUGUST JEUDE.

Witnesses:
JEAN GRUND,
CARL GRUND.